(12) United States Patent
Harris et al.

(10) Patent No.: US 6,415,827 B1
(45) Date of Patent: Jul. 9, 2002

(54) FILLER NECK CLOSURE ASSEMBLY

(75) Inventors: Robert S. Harris, Connnersville; Jason K. Jobe, Glenwood, both of IN (US)

(73) Assignee: Stant Manufacturing Inc., Connersville, IN (US)

(*) Notice: Subject to any disclaimer, the term of this patent is extended or adjusted under 35 U.S.C. 154(b) by 0 days.

(21) Appl. No.: 09/743,177

(22) PCT Filed: Jul. 9, 1999

(86) PCT No.: PCT/US99/15617
§ 371 (c)(1),
(2), (4) Date: Jan. 5, 2001

(87) PCT Pub. No.: WO00/02778
PCT Pub. Date: Jan. 20, 2000

Related U.S. Application Data
(60) Provisional application No. 60/092,300, filed on Jul. 10, 1998.

(51) Int. Cl.[7] .............................................. B65B 31/06
(52) U.S. Cl. ..................... 141/348; 141/59; 141/304; 141/305; 141/302; 141/94; 220/86.2
(58) Field of Search .......................... 141/59, 94, 290, 141/302, 304, 305, 348–350; 220/86.2; 137/588, 629

(56) References Cited

U.S. PATENT DOCUMENTS

| | | | |
|---|---|---|---|
| 3,730,216 A | * 5/1973 | Arnett et al. ............. 137/588 |
| 4,065,026 A | 12/1977 | Williams et al. | |
| 4,177,931 A | 12/1979 | Evans | |
| 4,228,915 A | 10/1980 | Hooper et al. | |
| 4,299,102 A | 11/1981 | Aro | |
| 4,305,522 A | 12/1981 | Gerdes | |
| 4,540,103 A | 9/1985 | Kasugai et al. | |
| 4,572,396 A | 2/1986 | Kasugai et al. | |
| 4,588,102 A | 5/1986 | Kasugai | |

(List continued on next page.)

FOREIGN PATENT DOCUMENTS

| | | |
|---|---|---|
| DE | 4214076 A | 11/1992 |
| EP | 0827914 A2 | 3/1998 |
| GB | 2255554 A | 11/1992 |
| GB | 2255554 A2 | 11/1992 |
| WO | WO99/05026 | 2/1999 |
| WO | WO 99/05026 | 2/1999 |
| WO | WO 00/02778 | 1/2000 |
| WO | WO 00/20292 | * 4/2000 |

OTHER PUBLICATIONS

United States Patent Application Publication, Pub. No. 2001/0013367A1, dated Aug. 16, 2001; Miura et al.
Translation of claims of Registered Japanese Patent No. 3200732.

*Primary Examiner*—J. Casimer Jacyna
(74) *Attorney, Agent, or Firm*—Barnes & Thornburg

(57) ABSTRACT

A closure assembly includes a filler neck, a housing, and an appearance cover. The housing includes a nozzle-receiving passageway and an interior region. A closure door is coupled to housing and prevents fuel vapor from flowing through passageway. A pressure-relief valve assembly is positioned within interior region and controls the flow of fuel vapor through interior region when the closure door is closed. A valve actuator is coupled to housing and includes a nozzle arm, a stem arm, and a conductor arm. Stem arm moves with nozzle arm and opens pressure-relief valve assembly when nozzle arm is engaged by a fuel-dispensing nozzle upon movement of a nozzle into passageway. A conductor arm is coupled to nozzle arm and is positioned to contact filler neck through an opening in housing. When a nozzle contacts the nozzle arm, any electrical charge present on the fuel-dispensing nozzle is conducted through nozzle arm and conductor arm to the filler neck.

25 Claims, 6 Drawing Sheets

U.S. PATENT DOCUMENTS

| | | |
|---|---|---|
| 4,597,504 A | 7/1986 | Witt |
| 4,660,058 A | 4/1987 | Cordery |
| 4,666,056 A * | 5/1987 | Kasugai et al. |
| 4,715,509 A * | 12/1987 | Ito et al. |
| 4,719,949 A * | 1/1988 | Mears |
| 4,724,868 A * | 2/1988 | Kasugai et al. |
| 4,730,652 A * | 3/1988 | Bartholomew |
| 4,765,505 A * | 8/1988 | Harris |
| 4,779,755 A * | 10/1988 | Harris |
| 4,785,961 A * | 11/1988 | Kasugai et al. |
| 4,790,449 A * | 12/1988 | Kyokuichi et al. |
| 4,795,053 A * | 1/1989 | Kasugai et al. |
| 4,854,471 A * | 8/1989 | Kasugai et al. |
| 4,944,425 A | 7/1990 | Kasugai et al. |
| 4,974,307 A | 12/1990 | Uebayashi et al. |
| 4,993,578 A | 2/1991 | Kerby |
| 5,148,934 A | 9/1992 | Kasugai et al. |
| 5,203,466 A | 4/1993 | Kasugai et al. |
| 5,238,136 A | 8/1993 | Kasugai et al. |
| 5,279,439 A | 1/1994 | Kasugai et al. |
| 5,395,004 A | 3/1995 | Griffin et al. |
| 5,449,086 A | 9/1995 | Harris |
| 5,520,300 A | 5/1996 | Griffin |
| 5,540,347 A | 7/1996 | Griffin |
| 5,615,793 A | 4/1997 | Muller |
| 5,638,975 A | 6/1997 | Harris |
| 5,640,993 A | 6/1997 | Kasugai et al. |
| 5,647,330 A | 7/1997 | Sawert et al. |
| 5,758,627 A | 6/1998 | Minagawa et al. |
| 5,975,328 A | 11/1999 | Hagano et al. |
| 5,992,669 A | 11/1999 | Hagano et al. |
| 5,992,670 A | 11/1999 | Hagano et al. |
| 5,992,672 A | 11/1999 | Hagano et al. |
| 5,996,829 A | 12/1999 | Hagano et al. |
| 5,996,830 A | 12/1999 | Hagano et al. |
| 6,003,709 A * | 12/1999 | Hagano et al. |
| 6,004,462 A * | 12/1999 | Yamada et al. |
| 6,168,713 B1 * | 1/2001 | Sekine et al. |
| 6,179,148 B1 * | 1/2001 | Harris |
| 6,197,858 B1 * | 3/2001 | Hagano et al. |
| 6,230,739 B1 * | 5/2001 | Gericke .................. 137/588 |
| 6,286,539 B1 * | 9/2001 | Nishi et al. |
| 6,296,014 B1 * | 10/2001 | Miura et al. |
| 6,305,408 B1 * | 10/2001 | Goto et al. |
| 6,308,852 B1 * | 10/2001 | Hagano et al. |

\* cited by examiner

FILLER NECK CLOSURE ASSEMBLY

This Application is a 371 of PCT/US99/15617 filed Jul. 9, 1999, which claim benefit of Provisional No. 60/092,300 filed Jul. 10, 1998.

BACKGROUND AND SUMMARY OF THE INVENTION

The present invention relates to a closure assembly for a tank filler neck, and particularly, relates to a closure assembly that permits a fuel filler nozzle to be inserted into a tank filler neck to supply fuel to a fuel tank and closes the tank filler neck when the fuel filler nozzle is removed from the closure assembly. More particularly, the present invention relates to filler neck closure vent apparatus.

Automobile fuel tanks are filled with fuel via a fill neck which opens to the exterior of the automobile body. The fill neck has a mouth which is closed by a removable cover. The automobile owner fills the fuel tank by removing the cover and placing a fuel-dispensing nozzle through the mouth and into the fill neck. Fuel is then routed through the fill neck and to the fuel tank.

According to the present invention, a filler neck closure assembly includes a portion made of an electrically conductive material. The filler neck has an inner surface defining a nozzle-receiving passageway and an outer end formed to include a mouth opening into the nozzle-receiving passageway. A closure door is mounted for movement relative to the filler neck and is positioned to lie within the nozzle-receiving passageway to engage a fuel-dispensing nozzle moving in the passageway. An actuator is made of an electrically conductive material and is mounted between the mouth and the closure door for movement relative to the filler neck. The actuator includes a conductor arm arranged to contact the electrically conductive portion of the filler neck and a nozzle arm positioned to lie within the nozzle-receiving passageway to engage a fuel-dispensing nozzle inserted into the passageway through the mouth.

In preferred embodiments, the nozzle arm is coupled to a conductor arm which transmits any electrical charge present from the fuel-dispensing nozzle to the filler neck. Thus, the fuel-dispensing nozzle is grounded before a closure door provided internally in the filler neck is opened by the fuel-dispensing nozzle and fuel is dispensed into the filler neck.

A stem arm also coupled to the nozzle arm moves with the nozzle are and engages a pressure relief valve found within the filler neck. A fuel-dispensing nozzle inserted into the filler neck contacts and moves the nozzle arm thereby moving the stem arm to open the pressure relief valve prior to the fuel dispensing nozzle engaging the closure door.

An appearance cover at the mouth of the filler neck includes a vent channel in communication with the pressure relief valve to provide a route for fuel vapor passing through the pressure relief valve to escape to the atmosphere. The appearance cover is movable to expose an open mouth in the filler neck to permit a user to insert a fuel-dispensing nozzle into the filler neck.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refer to the accompanying figures in which.

DETAILED DESCRIPTION OF THE DRAWINGS

Figure 1:
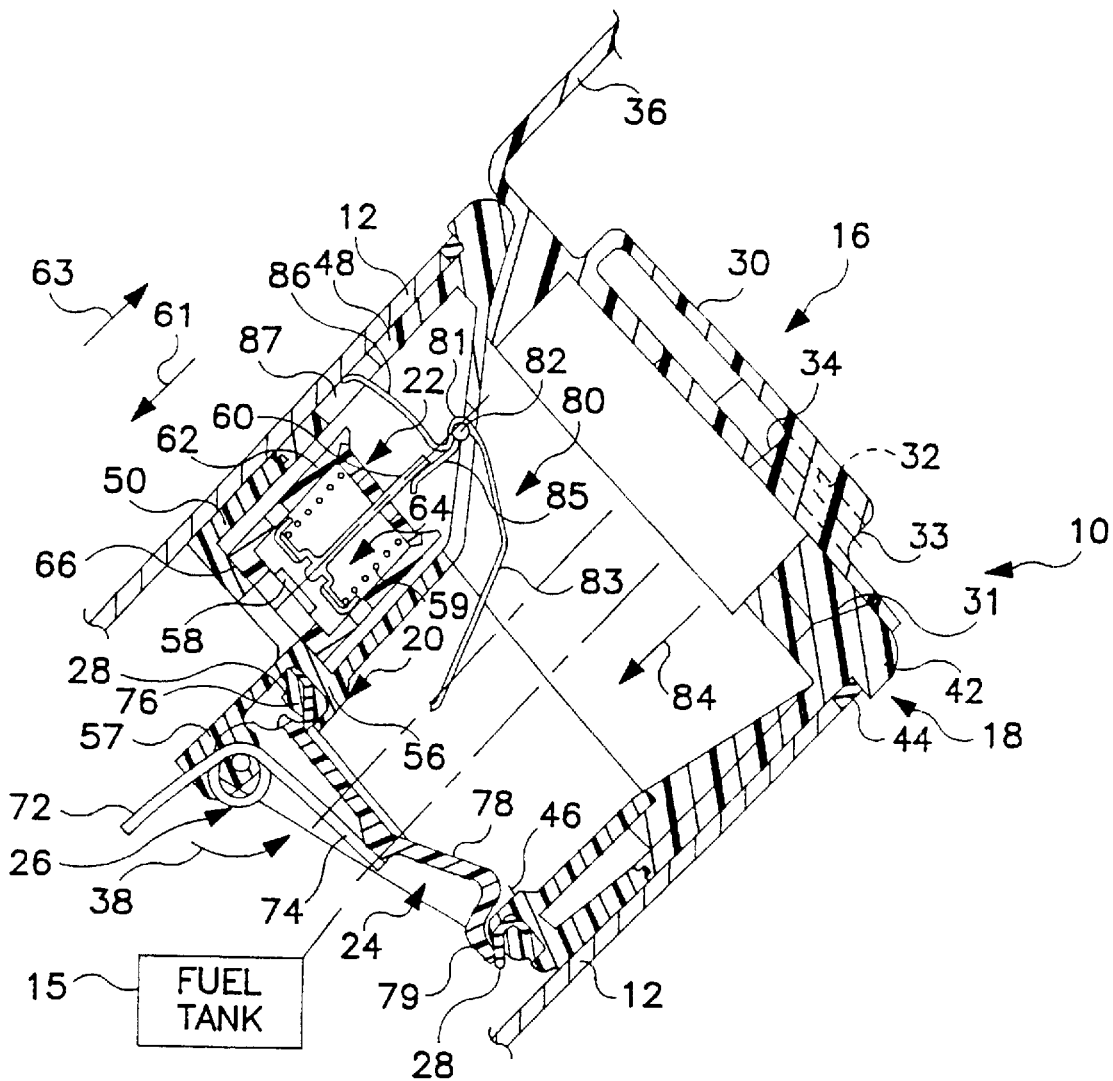
FIG. 1 is a sectional view of a closure assembly in accordance with the present invention mounted in a fuel tank filler neck and showing an internal spring-loaded closure door closing an internal nozzle-receiving aperture, a spring-loaded pressure-relief valve for controlling venting of the filler neck through a passageway separate from the nozzle-receiving aperture, and a valve actuator having a portion positioned to lie in front of the spring-loaded closure door so that it will be engaged and moved by a fuel-dispensing nozzle moving into the closure assembly after an appearance cover of the closure assembly has first been opened to actuate the pressure-relief valve, causing the valve to move to an opened position.
Figure 3:
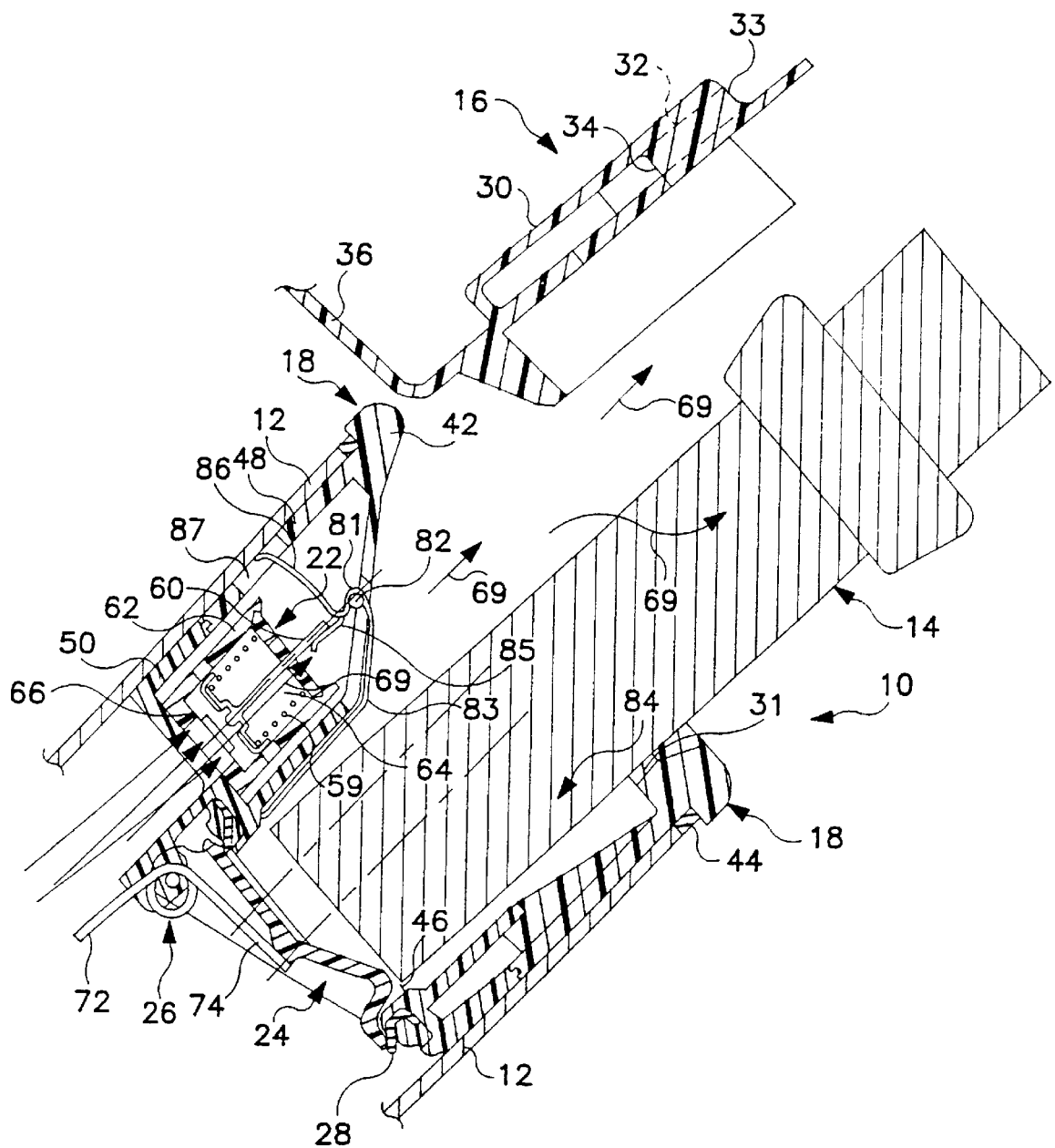
FIG. 3 is a sectional view similar to FIGS. 1 and 2 showing initial movement of a fuel-dispensing nozzle into the closure assembly after the appearance cover has been pivoted to an opened position and showing movement of the fuel-dispensing nozzle to pivot the valve actuator to a position causing the pressure-relief valve to open so that pressurized fuel vapor in the filler neck is able to vent past the pressure-relief valve and through the closure assembly to the atmosphere through the opened mouth of the closure assembly and causing an electrically conductive path to be established through the metal valve actuator from the nozzle to the filler neck to dissipate static charge on the nozzle by conducting such charge to ground.
Figure 4:
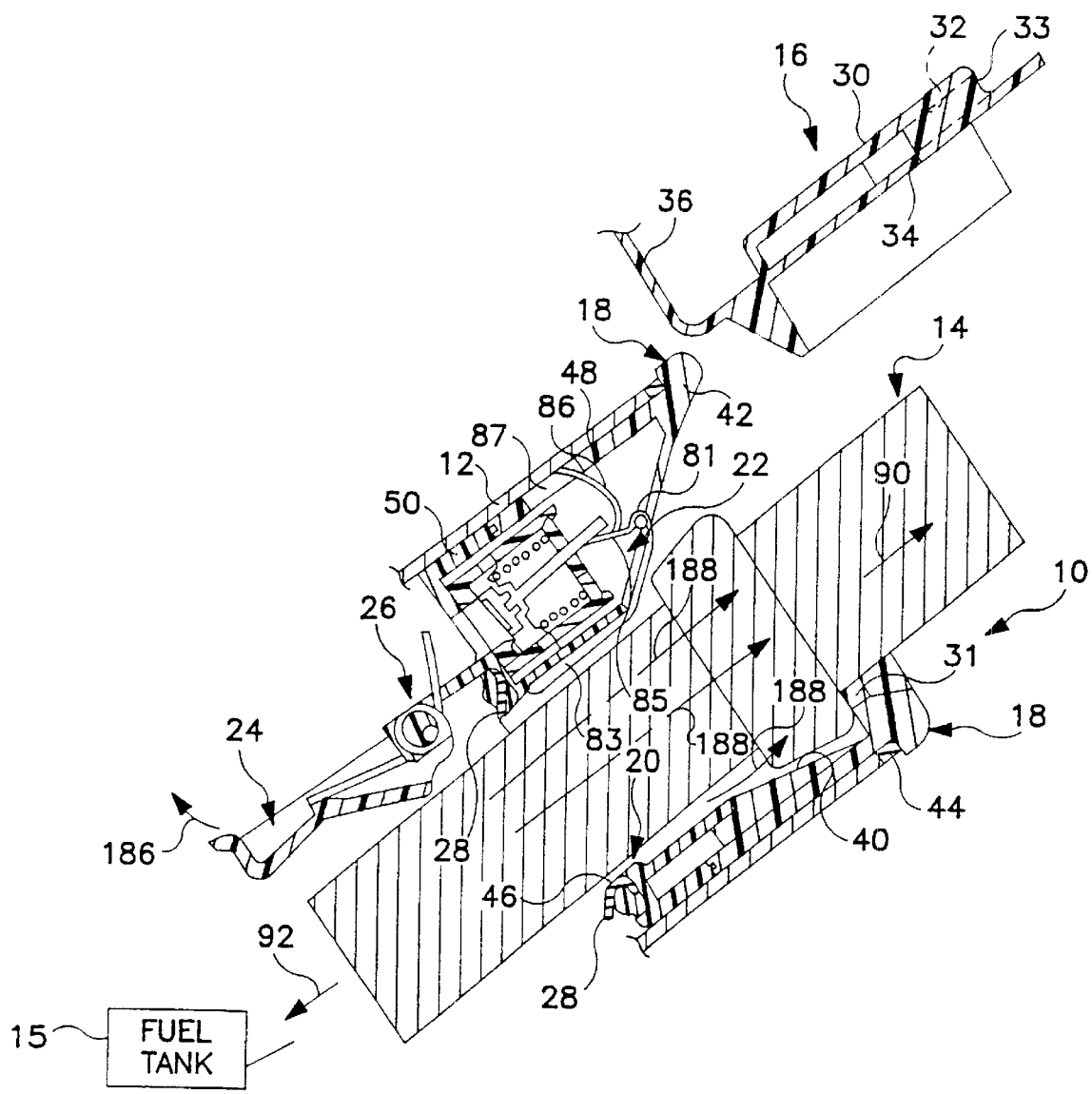
FIG. 4 is a sectional view similar to FIGS. 1–3 showing further movement of the fuel-dispensing nozzle into the closure assembly and filler neck during an initial stage of refueling to open the spring-loaded closure door and showing that all excess pressure extant in the filler neck has been vented through the opened pressure-relief valve.

A closure assembly 10 is provided for use in vehicle fuel tank filler neck 12 as shown in FIG. 1. The closure assembly 10 normally closes and seals the filler neck 12. A fuel-dispensing nozzle or fuel source 14 can be inserted into closure assembly 10 to provide fuel to fuel tank 15 through filler neck 12 as shown in FIGS. 3 and 4. Closure assembly 10 also permits the pressure within filler neck 12 to equalize with ambient air pressure within predetermined positive and negative pressure limits as shown, for example, in FIGS. 5 and 6.

Closure assembly 10 includes an appearance cover 16, an housing 18, an internal platform 20, a pressure-relief valve assembly 22, a closure door 24, a torsion spring 26, and seal 28 as shown in FIG. 1. Housing 18 is positioned to lie in an axially outer region of filler neck 12 and provides an interior portion lying inside filler neck 12. Closure assembly 10 seals and closes filler neck 12 by torsion spring 26 biasing closure door 24 upward in direction 38 against annular seal 28 while pressure-relief valve 22 is retained in a closed position as shown, for example, in FIG. 1.

Cover 16 is not intended to seal filler neck 12 but rather is intended to prevent foreign objects from entering filler neck 12. Cover 16 includes a closure portion 30 for blocking a mouth 31 formed in housing 18 and a tether 36. Closure portion 30 is formed to include a vent channel 32 having a first opening 33 communicating with the atmosphere and a second opening 34 communicating with a nozzle-receiving passageway 84 formed in closure assembly 10. Tether 36 is coupled to the body (not shown) of a vehicle (not shown). In alternative embodiments, the cover does not need to include a tether.

The housing 18 engages filler neck 12 and is configured to receive and house internal platform 20, pressure-relief valve assembly 22, closure door 24, and torsion spring 26. In the illustrated embodiment, housing 18 slides into filler neck 12 so that filler neck 12 may be crimped onto closure assembly 10. In alternative embodiments, the housing may be coupled to the filler neck in any suitable manner including a threaded connection.

Housing 18 is made of a plastics material and includes an outwardly-extending shoulder 42. An annular seal 44 is positioned to lie between the top of filler neck 12 and outwardly-extending shoulder 42 as shown in FIG. 1. A detent (not shown) in cover 16 snaps underneath a lip included in housing 18 to secure cover 16 over and within mouth 31 formed in housing 18. In preferred embodiments, the detent extends approximately 250 degrees about a central axis of housing 18.

In the illustrated embodiment, housing 18 is a two-piece housing 18 and includes an upper portion 48 and a lower portion 50. In alternative embodiments, the housing may be of one piece or multiple pieces.

Closure door 24 is rotatably coupled to bottom wall 56 of platform 20 and is biased upwardly in direction 38 by torsion spring 26 to close a nozzle-receiving aperture 46 formed in platform 20. Torsion spring 26 is coupled to torsion spring support 57 and includes a first leg 72 engaging torsion spring support 57 and a second leg 74 engaging closure door 24 to bias closure door 24 upwardly in direction 38. In alternative embodiments of the present invention, the torsion spring and closure door may be coupled to different structures.

Closure door 24 includes a coupling 76 coupled to bottom wall 56 and a circular plate 78. Circular plate 78 includes a circumferential sealing surface 79 that engages annular seal 28. Seal 28 is coupled to bottom wall 56 as shown in FIG. 1.

Figure 2:
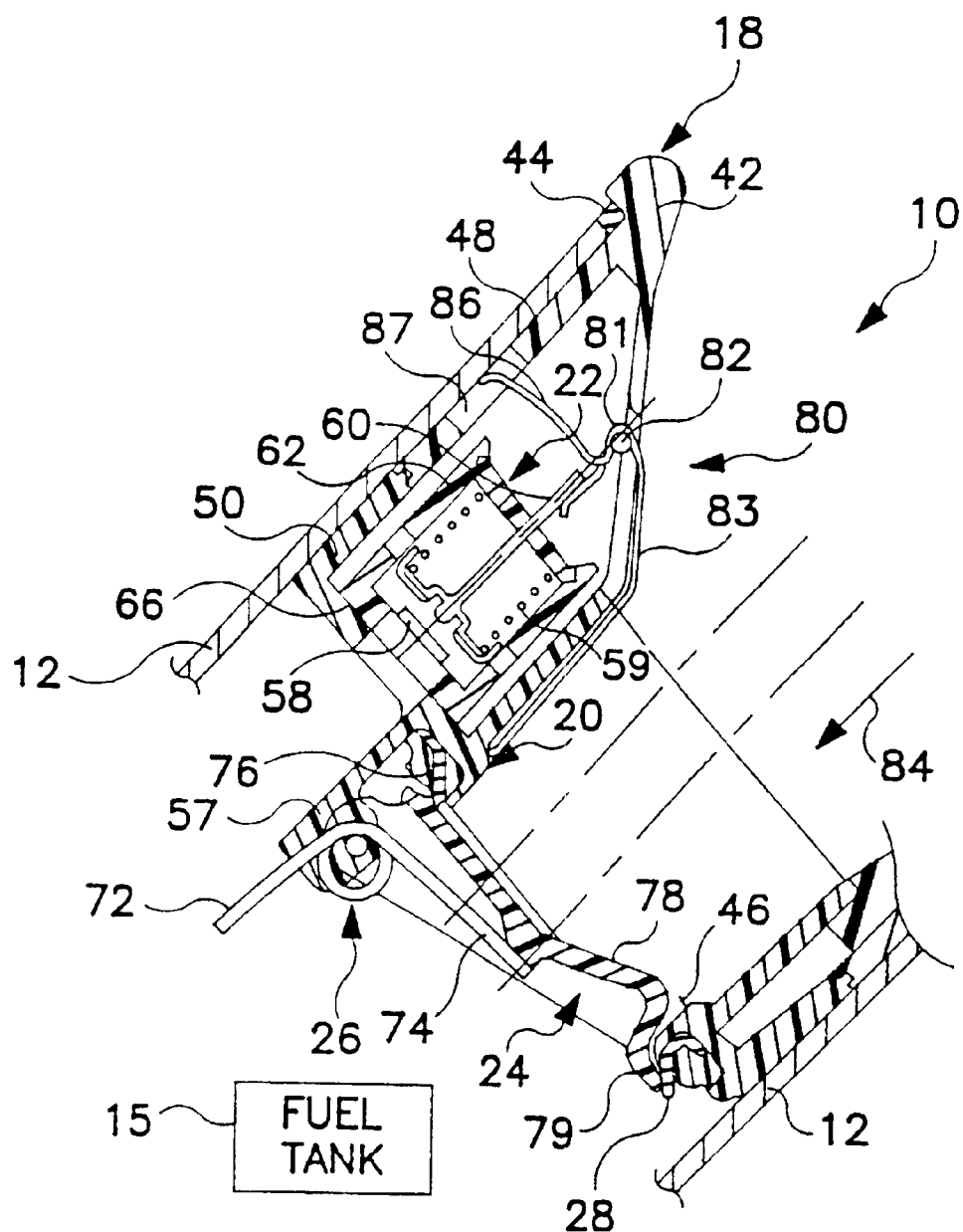
FIG. 2 is a sectional view similar to FIG. 1 showing pivoting movement of the valve actuator to act as a lever to move a stem associated with the pressure-relief valve so as to move the pressure-relief valve somewhat against a spring contained therein to an "offset" position to open the pressure-relief valve so that pressurized fuel vapor in the filler neck can vent past the pressure-relief valve to the atmosphere through the opened mouth of the closure assembly while the spring-loaded closure door remains in its closed position.

When fuel-dispensing nozzle 14 is inserted into closure assembly 10, nozzle 14 pushes closure door 24 in direction 186 against the bias of torsion spring 26 so that a portion of closure door 24 does not engage seal 28 as shown in FIG. 2. This permits pressurized vapor 1088 within filler neck 12 to flow past closure door 24 in direction 88 and through nozzle aperture 46 between nozzle 14 and nozzle guide tube 40 in direction 90 out of closure assembly 10. After filler nozzle 14 is pushed further into filler neck 12 and begins dispensing fuel in direction 92, ambient air enters filler neck 12 in direction 94 between nozzle 14 and nozzle guide tube 40.

Vacuum-relief valve 22 includes a valve plate 58, a stem 60 coupled to valve plate 58, a compression spring 59, a valve housing 62 having an interior region or bypass passageway 64, receiving valve plate 58, and stem 60 therein, and an annular valve seat 66 defining an inlet communicating pressurized fuel vapor from filler neck 12 to the atmosphere through interior region 64 and the rest of closure assembly 10.

Figure 5:
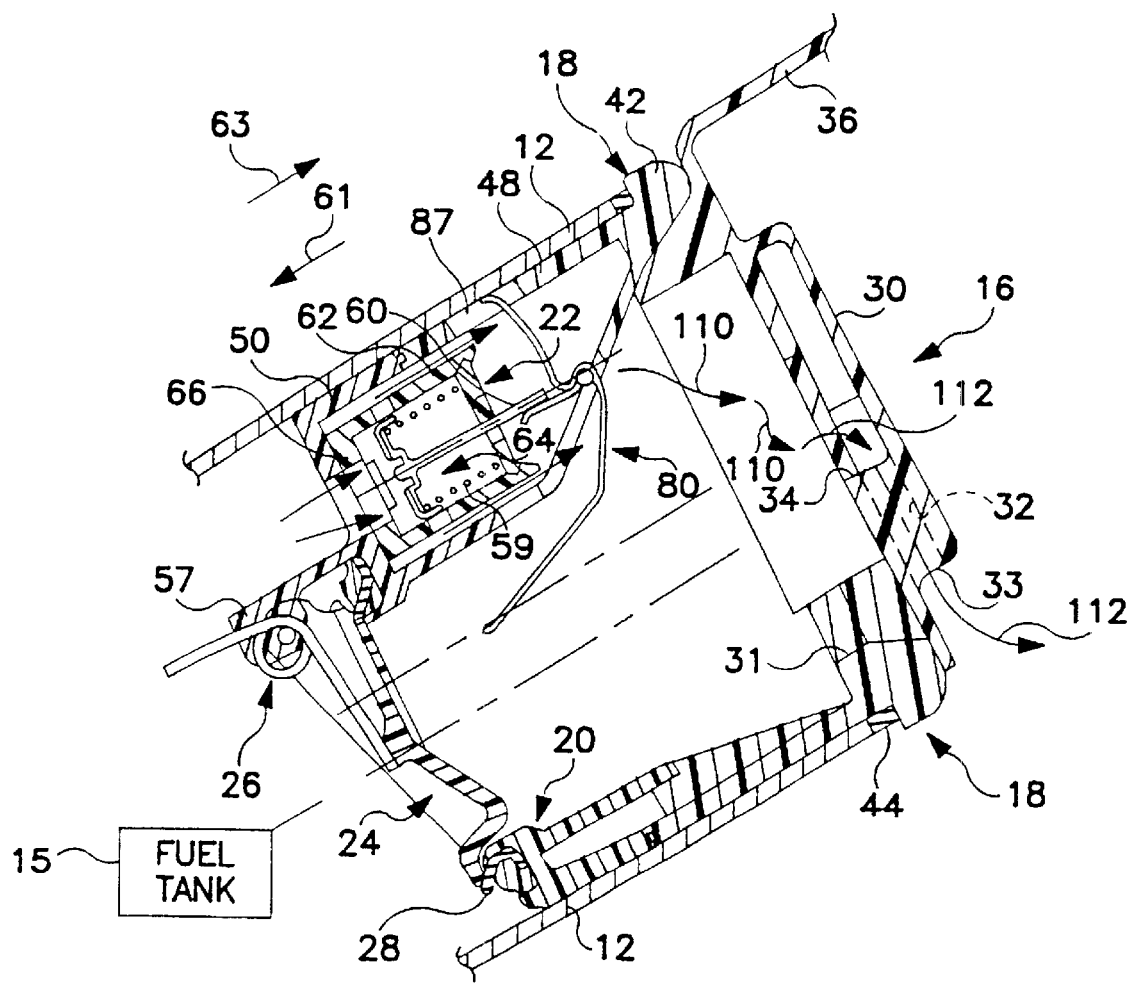
FIG. 5 is a sectional view similar to FIGS. 1–4 showing the spring-loaded closure door biased to its position closing the nozzle-receiving aperture but showing normal, axial movement of the pressure-relief valve to an opened position due to exposure of a valve disk in the pressure-relief valve to high-pressure fuel vapor in the filler neck and without movement of the valve actuator against the valve stem associated with the pressure-relief valve.

Valve plate 58 cooperates with compression spring 59 and housing 18 to function as a pressure-relief valve. The compression spring 59 biases valve plate 58 downward in direction 61 so that valve plate 58 seals against annular valve seat 66. Compression spring 59 permits valve plate 58 to move upward in direction 63 relative to housing 18 if excessive vapor pressure exists in filler neck 12 as shown in FIG. 5. The excessive vapor pressure moves valve plate 58 upward in direction 63 against the bias of compression spring 59 so that pressurized fuel vapor may flow out of closure assembly 10 through interior region 64 and housing 18 in direction 110 and through vent 32 formed in cover 16 in direction 112.

Figure 6:
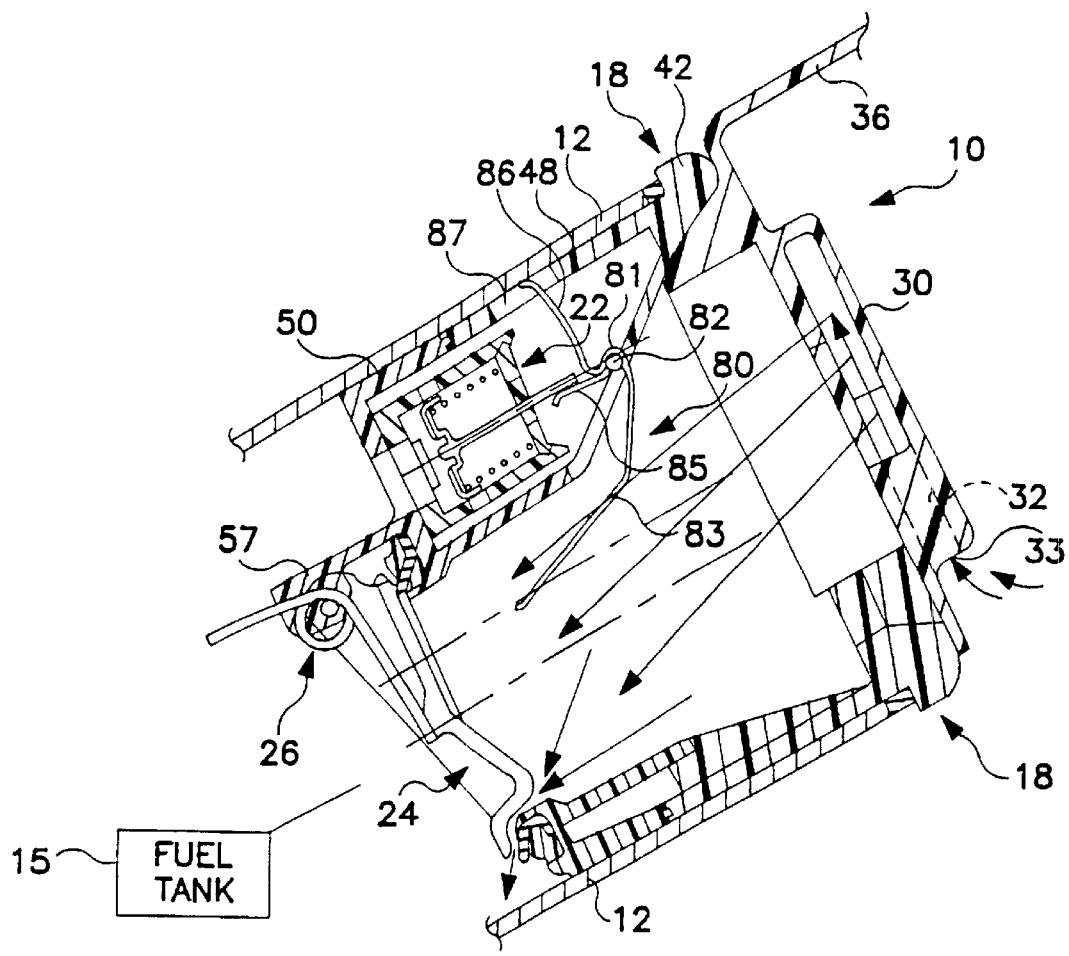
FIG. 6 is a sectional view similar to FIGS. 1–5 showing the pressure-relief valve in its closed position and showing movement of the spring-loaded closure door away from its annular seal due to negative pressure that has developed in the filler neck so that ambient air is able to flow into the filler neck through a vent passageway formed in the appearance cover and through an interior region of the closure assembly past the now-opened spring-loaded closure door.

The torsion spring 26 cooperates with closure door 24 and seal plate 20 to function as a vacuum valve as shown in FIG. 6. If a vacuum condition exists in filler neck 12, ambient air is permitted to flow into closure assembly 10 through vent 32 formed in cover 16 and "push" closure door 24 in direction 86 against the bias of torsion spring 26 so that the ambient air may flow past closure door 24 and into filler neck 12 in direction 92.

A valve actuator 80 is provided for moving vacuum-relief valve 22 to an opened position in response to insertion of fuel-dispensing nozzle 14 into closure assembly 10 during refueling. Valve actuator 80 operates to apply a force to stem 60 to dislodge valve plate 58 from sealed engagement with valve seat 66 to permit pressurized fuel vapor 69 in filler neck 12 to pass through the opening defined by valve seat 66, interior region 64 in valve housing 62, and open mouth 31 of housing 18 (since cover 16 is pivoted to its opened position during refueling) to reach the atmosphere outside of the closure assembly.

Valve actuator 80 is made of an electrically conductive material and includes a base 81 coupled for pivotable movement about pivot axis 82 to a portion of closure assembly 10 as shown, for example, in FIGS. 1–3. Valve actuator 80 further includes a nozzle arm 83 coupled to base 81 to pivot therewith and arranged to extend into a nozzle-receiving passageway 84 formed in closure apparatus 10 and communicating with open mouth 31 and nozzle-receiving aperture 46. Valve actuator 80 further includes a stem arm 85 coupled to base 81 to pivot therewith and arranged to engage and apply a lateral offset force to stem 60 during movement of fuel-dispensing nozzle 14 in nozzle-receiving passageway 84 toward closure door 24. Valve actuator 80 further includes a conductor arm 86 coupled to base 81 to pivot therewith and is arranged to extend through an opening 87 formed in housing 18 to establish electrical contact with the metal filler neck 12.

The valve actuator 80 operates in the following manner during fuel tank refueling. Fuel-dispensing nozzle 14 engages nozzle arm 83 as it moves in nozzle-receiving passageway 84 toward a closure door 24 to pivot valve actuator 80 about pivot axis 82 from its normal position shown in FIG. 1 in a clockwise direction to its actuated position as shown in FIG. 2. In the actuated position, stem arm 85 has moved against stem 60 in pressure-relief valve 22 to move the outermost tip of stem 60 in a lateral direction so as to cause valve plate 58 loaded by compression spring 59 and coupled to valve stem 60 to be moved somewhat to break the liquid fuel and fuel vapor seal established between valve plate 58 and annular valve seat 66. Once valve plate 58 is dislodged as shown, for example, in FIGS. 2 and 3, pressurized fuel vapor 69 extant in filler neck 12 can move through the now-open pressure-relief valve 22 as shown in FIG. 3 to reach the atmosphere. Valve stem 60 will remain in its canted or tilted position due to the urging force applied by stem arm 85 of valve actuator 80 as long as fuel-dispensing nozzle 14 remains in closure assembly 10. Once fuel-dispensing nozzle 14 is removed from closure assembly 10, a spring characteristic of the metal valve actuator 80 (preferably made of stainless steel) will cause valve actuator 80 to elastically return to its original position shown in FIG. 1. Movement of valve actuator 80 from the position shown in FIG. 1 to the deflected, valve-actuating position shown in FIG. 2 does not cause valve actuator 80 to exceed its elastic limit so that it can operate time and again each time a vehicle refueling activity is undertaken using fuel-dispensing nozzle 14.

As noted above, valve actuator 80 is made of an electrically conductive metal material so that it can act to establish an electrically conductive path from the metal tip of fuel-dispensing nozzle 14 to the metal filler neck 12 as shown, for example, in FIG. 3. This conductive path is established by nozzle arm 83, base 81, and conductor arm 86. As noted above, conductor arm 86 is arranged to pass through an opening 87 formed in the plastic housing 18 so as to reach and establish electrical conduct with the metal filler neck 12.

Features of this invention may be used in other closure assemblies including capless closure assemblies. Examples of capless closure assemblies are shown in U.S. Pat. No. 5,732,840 entitled "Closure Assembly For A Tank Filler Neck" and PCT Patent Application PCT/US98/02876 entitled "Seal For Filler Neck Closure Assembly", the disclosures of which are incorporated by reference herein.

Although the invention has been described in detail with reference to a certain preferred embodiment, variations and modifications exist within the scope and spirit of the invention as described and defined in the following claims.

What is claimed is:

1. A filler neck closure assembly comprising,
   a filler neck including a conductive portion made of an electrically conductive material, the filler neck having an inner surface defining a nozzle-receiving passageway and an outer end formed to include a mouth opening into the nozzle-receiving passageway,
   a closure door mounted for movement relative to the filler neck and being positioned to lie within the nozzle-receiving passageway to engage a fuel-dispensing nozzle moving in the passageway, and
   an actuator made of an electrically conductive material and mounted between the mouth and the closure door, the actuator including a substantially stationary conductor arm portion arranged to contact the conductive portion of the filler neck and a moveable nozzle arm portion being positioned to lie within the nozzle-receiving passageway to engage and be moved by a fuel-dispensing nozzle inserted into the passageway through the mouth.

2. The filler neck closure assembly of claim 1, wherein the filler neck further includes an interior portion made of an electrically non-conductive material and the actuator is mounted to the interior portion.

3. A filler neck closure assembly comprising,
   a filler neck including a conductive portion made of an electrically conductive material, the filler neck having an inner surface defining a nozzle-receiving passageway and an outer end formed to include a mouth opening into the nozzle-receiving passageway,
   a closure door mounted for movement relative to the filler neck and being positioned to lie within the nozzle-receiving passageway to engage a fuel-dispensing nozzle moving in the passageway,
   an actuator made of an electrically conductive material and mounted between the mouth and the closure door for movement relative to the filler neck, the actuator including a conductor arm arranged to contact the conductive portion of the filler neck and a nozzle arm being positioned to lie within the nozzle-receiving passageway to engage a fuel-dispensing nozzle inserted into the passageway through the mouth, and
   wherein the filler neck further includes an interior portion made of an electrically non-conductive material and the actuator is mounted to the interior portion.

4. The filler neck closure assembly of claim 3, wherein the interior portion includes an outer sleeve, the conductive portion of the filler neck is arranged to lie in spaced-apart relation to the nozzle arm to position a portion of the outer sleeve therebetween, the portion of the outer sleeve is formed to include an aperture therein, and the conductor arm is arranged to extend through the aperture to transmit an electrical charge from a fuel-dispensing nozzle engaging the nozzle arm to the conductive portion of the filler neck.

5. The filler neck closure assembly of claim 4, wherein the outer sleeve has a cylindrical shape and the conductive portion of the filler neck surrounds the outer sleeve and the aperture is formed in the outer sleeve to lie between the closure door and the mouth of the filler neck.

6. The filler neck assembly of claim 3, wherein the interior portion is formed to include a nozzle conduit having an inlet communicating with the mouth of the filler neck and an outlet lying in spaced-apart relation to the inlet and communicating with an inner region of the filler neck to define a portion of the nozzle-receiving passageway therebetween, the closure door is pivotably mounted to the nozzle conduit normally to close the outlet, and the interior portion further includes a bypass conduit having an inlet communicating with the inner region of the filler neck and an outlet communicating with the portion of the nozzle-receiving passageway and lying in spaced-apart relation to the inlet to define a bypass passageway therebetween to conduct pressurized fuel vapor extant in the inner region of the filler neck to the mouth of the filler neck when the closure door is positioned to close the outlet of the nozzle conduit and a portion of the actuator is positioned to lie in the outlet of the bypass passageway.

7. The filler neck of claim 6, further comprising a pressure-relief valve mounted in the bypass passageway for movement between an opened position allowing flow of fuel vapor through the bypass passageway to the mouth and a closed position blocking flow of fuel vapor through the bypass passageway to the mouth and the actuator further includes a stem arm coupled to the nozzle arm for movement therewith against the pressure-relief valve and relative to the interior portion from an inactive position to a valve-actuating position to cause the pressure-relief valve to be moved to the opened position in response to movement of the nozzle arm by a fuel-dispensing nozzle moving in the nozzle-receiving passageway.

8. The filler neck of claim 7, wherein the actuator includes a pivot mount coupled to the interior portion, each of the nozzle and conductor arms include a base coupled to the pivot mount, and a distal tip, the distal tips of the nozzle and conductor arms are positioned to lie in spaced-apart relation to define a wedge-shaped region therebetween and the stem arm is positioned to lie in the wedge-shaped region.

9. The filler neck of claim 3, wherein the interior portion is formed to include a bypass passageway, a pressure-relief valve is mounted in the interior portion to regulate fuel vapor flow through the bypass passageway to the mouth while the closure door is positioned to block flow of fuel vapor through the nozzle-receiving passageway, and the actuator further includes a stem arm arranged to move the pressure-relief valve to an opened position in the bypass passageway in response to movement of the nozzle arm by a fuel-dispensing nozzle moving in the nozzle-receiving passageway.

10. The filler neck of claim 9, herein the actuator further includes a pivot mount coupled to the interior portion, each of the nozzle, stem, and conductor arms is arranged to extend radially relative to the pivot mount, and the stem arm is arranged to lie between the nozzle and conductor arms.

11. A filler neck closure assembly comprising,
a filler neck having an inner surface defining a nozzle-receiving passageway and an outer end formed to include a mouth opening into the nozzle-receiving passageway,
a closure door mounted for movement relative to the filler neck, the closure door being positioned to lie within the nozzle-receiving passageway to engage a fuel-dispensing nozzle moving in the nozzle-receiving passageway,
a housing being positioned to lie within the nozzle-receiving passageway and formed to include an interior region to vent fuel vapor through the filler neck to the mouth while the closure door is closed,
an actuator mounted to the housing for movement relative to the filler neck, the actuator including a nozzle arm and a stem arm, and
a pressure-relief valve mounted within interior region for movement between an opened position allowing flow of fuel vapor through the interior region and to the mouth and a closed position blocking flow of fuel vapor, wherein the stem arm of the actuator is arranged to engage and move the pressure-relief valve to the opened position in response to movement of the nozzle arm by a fuel-dispensing nozzle moving in the nozzle-receiving passageway.

12. The filler neck closure assembly of claim 11, wherein the pressure-relief valve includes a valve seat having a fuel vapor inlet, a valve plate, a spring positioned to bias the valve plate against the valve seat to form a vapor seal therebetween, and a stem coupled to the valve plate, and wherein the stem arm is arranged to engage and tilt the stem to break the vapor seal.

13. The filler neck closure assembly of claim 12, wherein the filler neck defines a central axis and the nozzle arm is positioned to lie between the pressure-relief valve and the central axis.

14. The filler neck closure assembly of claim 13, wherein the housing further includes a pivot, the nozzle arm and stem arm are coupled to and move about the pivot, and the pivot is positioned to lie between the pressure-relief valve and the mouth.

15. The filler neck closure assembly of claim 14, further comprising a cover being positioned to lie within the mouth, the cover including a vent channel in communication with the interior region of the housing and the atmosphere.

16. The filler neck closure assembly of claim 11, further comprising a cover being positioned to lie within the mouth, the cover including a vent channel in communication with the interior region of the housing and the atmosphere.

17. A filler neck closure assembly comprising,
a filler neck including a conductive portion made of an electrically conductive material, the filler neck having an inner surface defining a nozzle-receiving passageway and an outer end formed to include a mouth opening into the nozzle-receiving passageway,
a closure door mounted for movement relative to the filler neck, the closure door being positioned to lie within the nozzle-receiving passageway to engage a fuel-dispensing nozzle moving in the nozzle-receiving passageway,
a housing made of an electrically non-conductive material, the housing being positioned to lie within the nozzle-receiving passageway and formed to include an interior region to vent fuel vapor through the filler neck to the mouth while the closure door is closed,
an actuator made of an electrically conductive material and mounted to the housing for movement relative to the filler neck, the actuator including a stem arm, a nozzle arm being positioned to lie within the nozzle-receiving passageway to engage a fuel-dispensing nozzle inserted into the passageway through the mouth, and a conductor arm arranged to contact the conductive portion of the filler neck, and
a pressure-relief valve mounted within interior region for movement between an opened position allowing flow of fuel vapor through the interior region and to the mouth and a closed position blocking flow of fuel vapor, wherein the stem arm of the actuator is arranged to engage and move the pressure-relief valve to the opened position in response to movement of the nozzle arm by a fuel-dispensing nozzle moving in the nozzle-receiving passageway.

18. The filler neck closure assembly of claim 17, wherein the pressure-relief valve includes a valve seat having a fuel vapor inlet, a valve plate, a spring positioned to bias the valve plate against the valve seat to form a vapor seal therebetween, and a stem coupled to the valve plate, and wherein the stem arm is arranged to engage and tilt the stem to break the vapor seal.

19. The filler neck closure assembly of claim 18, wherein the filler neck defines a central axis and the nozzle arm is positioned to lie between the pressure-relief valve and the central axis.

20. The filler neck closure assembly of claim 19, wherein the housing further includes a pivot, the nozzle arm, stem arm and conductor arm are coupled to and move about the pivot, and the pivot is positioned to lie between the pressure-relief valve and the mouth.

21. The filler neck closure assembly of claim 20, further comprising a cover being positioned to lie within the mouth, the cover including a vent channel in communication with the interior region of the housing and the atmosphere.

22. The filler neck closure assembly of claim 17, further comprising a cover being positioned to lie within the mouth, the cover including a vent channel in communication with the interior region of the housing and the atmosphere.

23. A filler neck closure assembly comprising, a filler neck including a grounded portion made of an electrically conductive material, a housing mounted in the filler neck and having an inner surface defining a nozzle-receiving passageway and an outer end formed to include a mouth opening into the nozzle-receiving passageway, a closure door mounted in the housing for movement relative to the filler neck and being positioned to lie within the nozzle-receiving passageway to engage a fuel-dispensing nozzle moving in the passageway, and an actuator made of an electrically conductive material and mounted in the housing and including a relatively stationary conductor arm portion arranged to electrically contact the conductive portion of the filler neck and a moveable nozzle arm portion being positioned to lie within the nozzle-receiving passageway to engage and be moved by a fuel-dispensing nozzle inserted into the passageway through the mouth.

24. The filler neck closure assembly of claim 23, wherein the housing includes an interior portion made of an electrically non-conductive material and the actuator is mounted to the interior portion.

25. The filler neck closure assembly of claim 24, wherein the housing includes an outer sleeve, formed to include an aperture therein, and the conductor arm portion is arranged to extend through the aperture to transmit an electrical charge from a fuel-dispensing nozzle engaging the nozzle arm portion to the conductive portion of the filler neck.

* * * * *